United States Patent [19]

Day

[11] Patent Number: 4,463,546
[45] Date of Patent: Aug. 7, 1984

[54] WINDROW PICKUP MECHANISM

[75] Inventor: Richard L. Day, Port Byron, Ill.

[73] Assignee: Deere & Company, Moline, Ill.

[21] Appl. No.: 406,639

[22] Filed: Aug. 9, 1982

[51] Int. Cl.³ .................... A01D 89/00; A01D 43/00
[52] U.S. Cl. ........................................ 56/364; 56/190
[58] Field of Search .......... 56/16.4, 344, 364, DIG. 9, 56/345, 341, 190, 226, 502, 208

[56] References Cited

U.S. PATENT DOCUMENTS

| | | |
|---|---|---|
| 2,691,266 | 10/1954 | Meyer et al. ........................... 56/364 |
| 3,474,605 | 10/1969 | Resctich ................................ 56/16.4 |
| 4,120,137 | 10/1978 | Schoeneberger et al. ............. 56/364 |
| 4,171,606 | 10/1979 | Ziegler et al. ......................... 56/364 |
| 4,304,090 | 12/1981 | Gavrilenko et al. .................. 56/364 |

OTHER PUBLICATIONS

Deere & Comp., Operator Manual OM-H102834, Issue D9, inside cover and pp. 4-6.

Primary Examiner—Gene Mancene
Assistant Examiner—John G. Weiss

[57] ABSTRACT

An endless belt type windrow pickup mechanism is mounted on the front of a combine platform and includes a frame with opposite sides supported on ground engaging gauge wheels so that the opposite sides of the frame swing vertically relative to one another as the machine advances over uneven terrain. The pickup mechanism includes a belt with a large number of fingers that lift the crop from the ground and move the crop rearwardly along the upper run of the belt. An improved windrow hold-down device has a plurality of flexible fingers that engage the top of the mat of crop material moving rearwardly on the upper run of the belt, and means are provided for adjusting the attitude of the fingers and also accommodating vertical shifting of one side of the pickup mechanism relative to the other.

10 Claims, 7 Drawing Figures

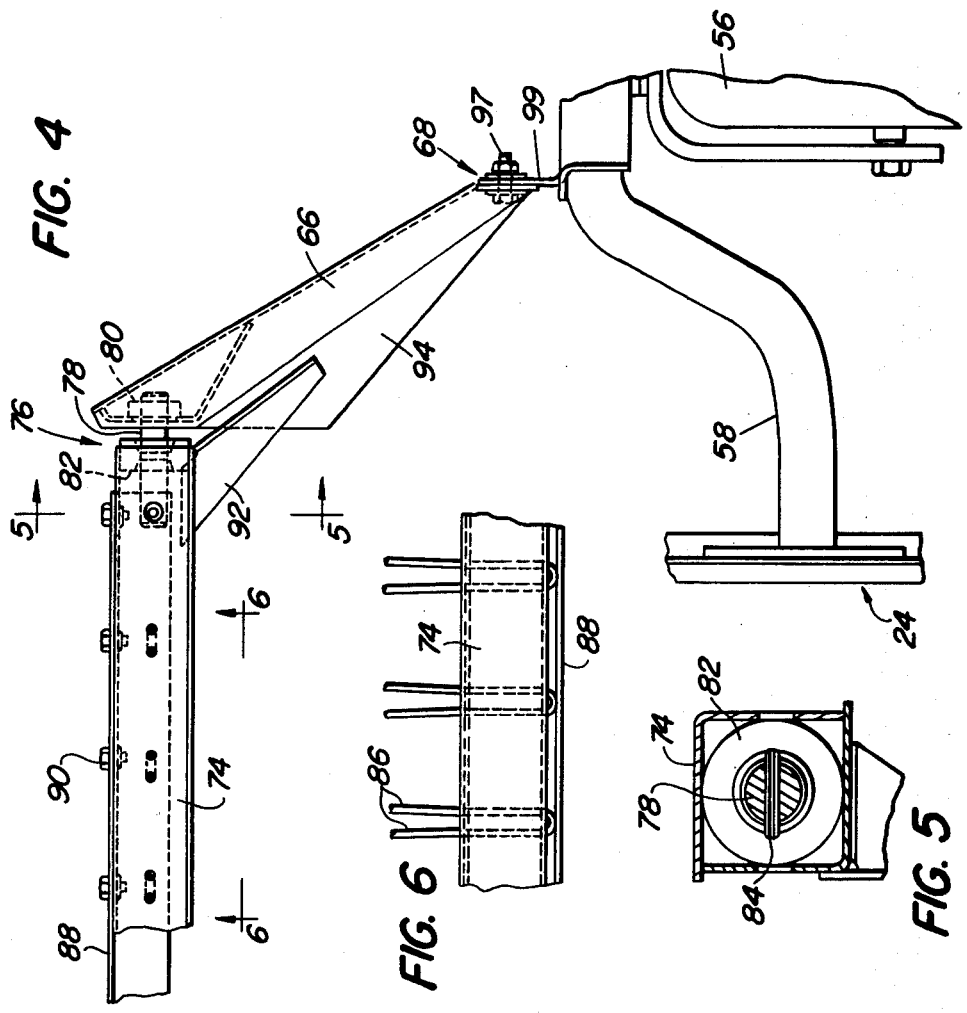
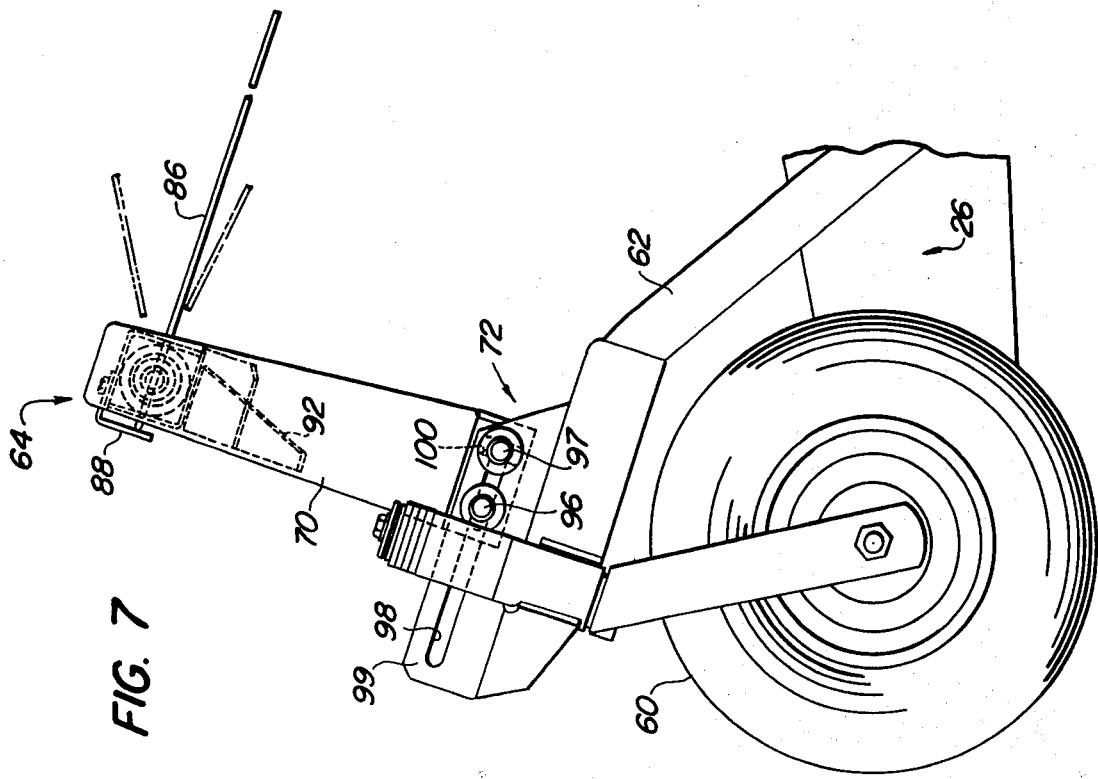

WINDROW PICKUP MECHANISM

BACKGROUND OF THE INVENTION

This ivention relates to a belt type pickup mechanism that mounts on an auger type grain harvesting platform on a combine, and more particularly to an improved windrow hold-down device that controls the mat of crop material after it is raised from the ground and while it is being moved rearwardly on the upper run of the pickup belt.

A grain combine typically includes a transversely elongated header with a crop converging suger. When the combine is operating in a standing crop, the platform is provided with a cutting device along its leading edge for severing the crop material from the field. However, with certain crops and in certain areas, the standing crop is first cut and allowed to dry in the field, the crop being laid in windrows by a windrowing machine. In such a case, the combine is provided with a pickup mechanism at the front of the platform that raises the windrow of crop material from the ground as the machine advances and feeds it rearwardly to the crop converging auger on the combine platform. In many cases, the pickup mechanism utilizes a belt having a large number of outwardly extending fingers that engage the crop material and elevate it from the ground, the crop material then being conveyed rearwardly on the upper run of the belt to the platform auger. A machine of the above general type is disclosed in U.S. Pat. No. 3,474,605, which is also assigned to the assignee herein.

In such a machine, the pickup is supported relatively close to the ground by a pair of gauge wheels at opposite sides of the pickup mechanism. Since the gauge wheels roll along the ground, which frequently is quite rough and uneven, the frame of the pickup mechanism is designed so that it is flexible enough to accommodate vertical movement of one side of the frame relative to the other.

It is also conventional to provide a device known as a windrow hold-down or wind guard above the pickup belt to hold the mat of crop material down on the upper run of the belt so that it does not bunch up on the top of the belt in front of the auger, it being desirable that the crop material be fed under the front side of the auger in a mat of fairly consistent thickness. Typically, a windrow hold-down device comprises a number of fore-and-aft fingers that are mounted on and extend rearwardly in cantilever fashion from a transverse bar above the upper run of the pickup belt. The fingers normally engage the top of the mat of the crop material moving rearwardly along the upper run of the belt and prevent the formation of bunches of crop material on the top of the belt, the flexibility of the fingers allowing for some variation in the thickness of the mat of crop material. However, since crop conditions vary and there is a wide variation in the amount of crop material lying in a windrow, means are normally provided to adjust the clearance between the fingers in the top of the belt since the thickness of the windrows vary due to changes in the crop or crop conditions.

While the hold-down fingers have been adjustable, in the past they have been mounted on a bar that has its opposite ends rigidly attached to the opposite sides of the pickup mechanism frame. Since the opposite ends of the frames shift vertically relative to one another when operating on rough terrain, some distortion of the rigidly connected windrow hold-down structure occurs, which, in some severe cases, has resulted in failure of the structure. Also, while the rigidly mounted fingers are free to flex vertically to accommodate some variation in the thickness of the mat of crop material, when operating in extremely heavy windrow conditions, the fingers have not been able to flex far enough so that they do not restrict the flow of material to the platform.

SUMMARY OF THE INVENTION

According to the present invention, an improved windrow hold-down mechanism is provided for a belt type windrow pickup mechanism.

An important feature of the invention resides in the provision of means for accommodating vertical shifting of one side of the pickup mechanism frame relative to the other.

Another feature of the invention resides in the provision of pivot means at the opposite ends of the bar that supports the hold-down fingers so that the fingers are swingable upwardly to accommodate a substantial increase in thickness of the mat of material moving into the machine, stop means being provided to establish the lowermost position of the fingers. The swingable mounting of the bar that carries the fingers also permits the fingers to be swung upwardly out of the way when performing maintenance on the machine.

Still another feature of the invention resides in the provision of means for easily adjusting the attitude or angle of the fingers and thereby the clearance between the fingers and the belt, as well as providing for fore-and-aft adjustment of the entire windrow hold-down device.

BRIEF DESCRIPTION OF THE DRAWINGS

FIG. 4 is a rear view of a portion of the right hand end of the pickup mechanism showing the mounting of the right end of the hold-down device.

FIG. 5 is a vertical section viewed along line 5—5 of FIG. 4.

FIG. 6 is a plan view of a section of the hold-down device as viewed along line 6—6 of FIG. 4.

FIG. 7 is a side view of a portion of the left hand end of the pickup mechanism showing the left end of the windrow hold-down device.

DESCRIPTION OF THE PREFERRED EMBODIMENT

Figure 1:
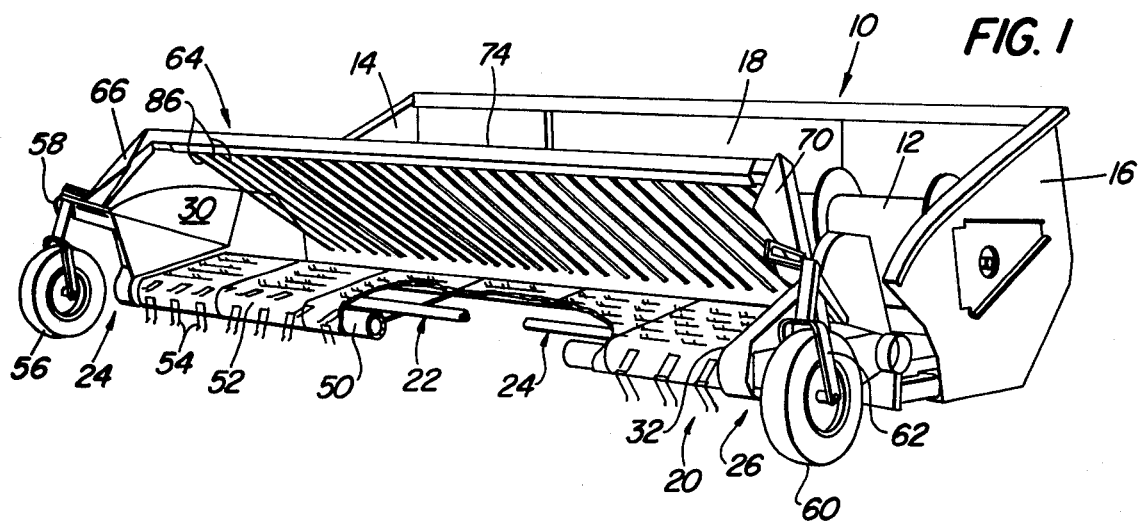
FIG. 1 is a left front perspective of a combine platform having the improved belt type pickup mechanism mounted thereon.
Figure 2:
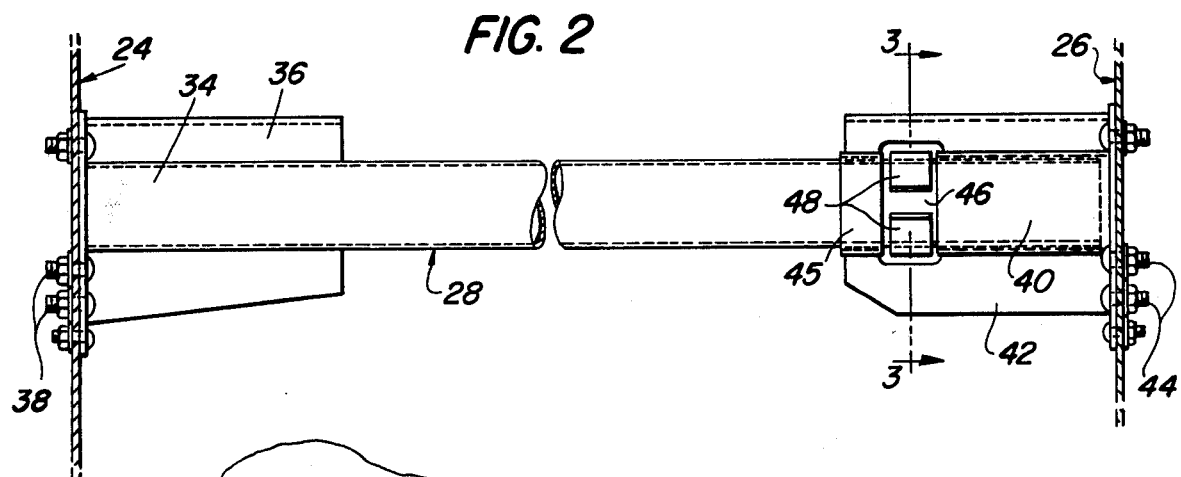
FIG. 2 is a plan view of a portion of the frame of the pickup mechanism.
Figure 3:
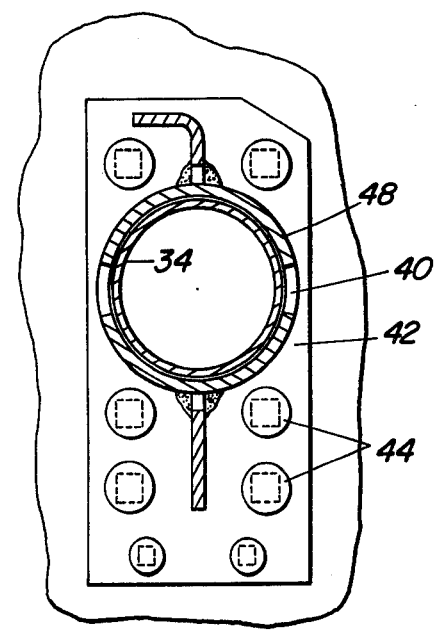
FIG. 3 is a vertical section viewed along 3—3 of FIG. 2.

The windrow pickup mechanism is indicated in its entirety by the numeral 20 and is mounted on the front end of a tranversely elongated combine platform or header, indicated in its entirety by numeral 10. As is well known, the platform 10 is carried in front of a combine and includes a transversely extending auger 12 extending between the opposite platform sides 14 and 16. The auger converges crop material that is delivered to the platform and discharges it rearwardly through a discharge opening 18 which registers with an opening in the feeder house of the combine (not shown).

The windrow pickup mechanism is attached to the platform and includes a frame, indicated in its entirety by the numeral 22, the frame including right and left sides 24 and 26. The opposite sides of the frame are connected by a transverse torque tube indicated generally by a numeral 28. The right side of the frame 24 includes a generally upright panel 30, and the left side of the frame 24 includes a similar panel 32.

One end 34 of the torque tube 28 is rigidly welded to a bracket 36 that is attached to the right side of the frame 24 by means of bolts 38. The other end of the torque tube 28 is rotatably received in a socket 40 that is welded to a bracket 42, which in turn is rigidly attached to the left frame side 26 by a plurality of bolts 44. A second relatively short tubular socket 45 is also welded to the bracket 42 in axial alignment with the main socket 40, the torque tube also extending through and being rotatable in the socket 45, which is spaced from the end of the main socket 40 to provide a gap 46. A pair of arcuate tabs 48 are welded to the exterior of the torque tube in the gap between these sockets, and the axial dimension of the tabs 48 is somewhat less than the length of the gap 46. As is apparent, the axial movement of the torque tube relative to the sockets is limited by the engagement of the opposite sides of the tabs 48 with the edges of the gap 46 between the sockets, so that one side frame member is not only rotatable relative to the other, but shiftable toward or away from the opposite side of the frame to a limited degree. The above flexible connection between the opposite sides of the frame permits vertical adjustment of one side of the frame relative to the other so that the frame is free to flex to follow the contour of the ground.

As described in greater detail in said U.S. Pat. No. 3,474,605, three rollers 50 extend between the opposite sides of the frame, and a draper type belt 52 is trained around the rollers 50. The belt is conventionally formed by a plurality of side-by-side belt sections and includes a large number of outwardly extending pickup fingers 54 that sweep close to the ground at the forward end of the pickup mechanism to engage windrowed crop material lying on the ground. The crop material is then conveyed rearwardly on the rearwardly moving upper run of the belt 52, the rear roller of the pickup mechanism being disposed immediately in front of the lower side of the auger 12 so that that crop material is discharged immediately in front of the lower side of the auger.

The right side 24 of the frame 22 is attached to the platform and is also supported by means of a gauge wheel 56, which is connected to the right frame side by a wheel mounting structure 58. Similarly, the left frame side 26 is supported on the platform and also by a gauge wheel 60 that is connected to the left frame side by means of a mounting structure 62. The gauge wheels, of course, roll along the ground, and, when the machine is being operated on uneven terrain, the gauge wheels cause one side of the frame to rise and fall relative to the opposite side according to the contour of the ground.

An improved windrow hold-down device is indicated generally by the numeral 64 and spans the width of the pickup mechanism 20 above the upper run of the belt 52. The windrow hold-down device includes a generally upright right support member 66 connected to the right gauge wheel mounting structure 58 by means of a mounting device 68. A similar support member 70 extends upwardly from the left gauge wheel mounting device 62 and is connected thereto by a mounting device 72. As best seen in FIG. 4 and FIG. 7, the support members 66 and 70 are inclined upwardly and rearwardly and are also inclined inwardly.

A transverse tubular member 74 extends between the upper ends of the support members 66 and 70. The opposite ends of the tubular member 74 are respectively pivotably connected to the upper ends of the respective support members 66 and 70 by means of pivots 76. Each pivot includes an axially transverse pivot shaft 78 secured to the support member by means of a fastener element 80 and extending inwardly through a bushing 82 mounted in the end of the tubular members 74. As best seen in FIG. 4, the inner diameter of the bushing 82 is only slightly larger than the diameter of the shaft 78 so that the bushing is rotatable on the shaft. As is also shown in FIG. 4, the bore through the bushing 82 is larger at the opposite ends of the bore so that there is a relatively short axial contact length between the bushing and the shaft, which allows for a degree of axial misalignment between the shaft and the bushing, which occurs when one side of the pickup mechanism shifts vertically relative to the other when operating on uneven terrain.

As shown in FIG. 5, a roll pin 84 is insertable through a transverse bore in the inner end of the shaft 78 inwardly of the bushing 82, access to the pin being provided through openings in the tubular member 74. As is apparent, a gap is provided between the outer end of the bushing 82 and the opposite support member and another gap is provided between the roll pin 84 and the inner end of the bushing 82 allowing a limited amount of side-to-side movement of the tubular member on the pivot shaft 78. As previously described, the torque tube 28 connection to the left frame side 26 also permits limited movement of one side of the frame toward and away from the other side of the frame.

A plurality of springlike fingers 86 extend rearwardly from the tubular member 74, the fingers being formed by U-shaped flexible rods having their free ends inserted through parallel fore-and-aft bores in the tubular member 74. As best seen in FIG. 6, after the fingers 86 are inserted through the bores in the tubular member 74, a retainer 88 is bolted to the front side of the tubular member by means of bolts 90, the retainer member engaging the closed ends of the U-shaped fingers 86 to hold them in place. Obviously, the fingers can be easily replaced by simply removing the retainer and withdrawing the fingers from the holes through the tubular member.

A stop arm 92 depends downwardly from each end of the tubular member 74 and is engageable with a rearwardly facing surface 94 on the opposite support members 66 and 70. Engagement of the stop arm 92 with the surface 94 limits the clockwise rotation of the tubular member 74 when viewed from the right side of the machine (FIG. 7) thereby limiting the downward swinging movement of the fingers 86. However, the fingers can be rotated upwardly to accommodate mats of crop material that are thicker than the clearance between the belt and the ends of the fingers, the weight of the fingers normally holding the stop arms 92 against the respective support members to establish the lowermost position of the fingers. The pivotal connection of the tubular member to the support members also permits swinging of the fingers upwardly and forwardly to improve access to the top of the pickup mechanism.

The mounting devices 68 and 72 for the support arms are similar, and only the left hand mounting device 72 which is best seen in FIG. 7 will be described in detail.

The mounting device includes a pair of nut and bolt type fasteners 96 and 97, the forward fastener 96 extending through a transverse bore in the lower end of the support arm 70 and through a fore-and-aft elongated slot 98 in an upright plate 99 attached to the gauge wheel mounting structure 62. The fastener 97 also extends through the slot 98 and a vertical slot 100 in the support member 70. By loosening the two fasteners 96 and 97, and sliding the fasteners along the slot 98, the fore-and-aft position of the support arm can be varied. The angular position of the support arm can also be varied by loosening the fasteners 96 and 97 and swinging the support arm up about the axis of the fastener 96, the vertical slot 100 accommodating the swinging movement of the arm. The arm is locked in the desired position by tightening the respective fasteners 96 and 97. The support arm 70 is shown in an intermediate angular position in FIG. 7, wherein the attitude of the fingers 86 in the extreme positions of angular adjustment of the support arms are shown in dotted lines.

As is apparent, the angular adjustment of the support arms 70 and 66 permits adjustment of the clearance between the ends of the fingers 86 and the upper run of the belt 52, and the fore-and-aft adjustment of the support arms provides adjustment of the distance between the rearward ends of the fingers 86 and the auger 12. Also, as previously described, the fingers 86 are swingable upwardly from their lowermost position established by the stop arms 92 to accommodate a greater thickness of the mat of crop material moving into the machine, while the pivot devices 76 accommodate both side-to-side adjustment and vertical adjustment of one side of the machine relative to the other, such as occurs when the machine is being operated on rough terrain.

I claim:

1. In a harvester having a forward harvesting platform and a pickup mechanism mounted on the front of the platform and including a frame having opposite vertically shiftable sides respectively supported on ground engaging gauge wheels so that the opposite sides shift vertically relative to one another as the gauge wheels move over uneven terrain, and a pickup belt extending between the opposite sides and having a rearwardly moving upper run operative to convey crop material lifted from the ground rearwardly to the platform, the combination therewith of an improved holddown mechanism mounted on the pickup mechanism above the upper run of the belt for controlling the top of the mat of crop material on the belt and comprising:
   a pair of generally upright support members;
   mounting means respectively mounting the lower ends of the support members to the opposite sides;
   a transverse tubular member extending between the support members;
   a plurality of fingers mounted on and extending rearwardly from the tubular member in cantilever fashion;
   a pair of pivot means respectively connecting the opposite ends of the tubular member to the upper ends of the respective support members for free rotation of the tubular member relative to the support during operation of the machine and including means for accommodating axial misalignment between the pivot means during vertical shifting of one side relative to the other; and stop means operative between the tubular member and at least one of the support members to limit rotation of the tubular member in a direction wherein the fingers swing downwardly to establish a minimum clearance between the fingers and the belt.

2. The invention defined in claim 1 wherein each pivot means includes a shaft connected to one member and an annular bushing connected to the other and operative to journal the shaft, the contact area of the shaft with the bushing being relatively small to accommodate axial misalignment of the shaft relative to the bushing.

3. The invention defined in claim 2 wherein each shaft extends a substantial distance from both ends of the bushing to accommodate limited axial shifting of the tubular members relative to the support members.

4. The invention defined in claim 3 wherein the shafts of the pivot means are respectively connected to the support members and the bushings are mounted in the opposite ends of the tubular members.

5. The invention defined in claim 4 wherein each mounting means includes adjustment means operative to mount the support members on the side in alternate angular position about a transverse axis to position the fingers at different angles from the horizontal when stop means is engaged.

6. The invention defined in claim 5 wherein the adjustment means are also operative to mount the support members in alternate fore-and-aft positions on the respective sides.

7. The invention defined in claim 1 wherein each mounting means includes adjustment means operative to mount the support member on the side in alternate angular position about a transverse axis to position the fingers at different angles from the horizontal when the stop means is engaged.

8. The invention defined in claim 7 wherein each mounting means includes a first bolt extending through a transverse opening in the support member and the frame side to swingably connect the support members to the frame side, and a second bolt extending through a generally vertical slot in the support member and a transverse opening in the frame side to releasably clamp the support to the frame side in alternate angular position about the first bolt.

9. The invention defined in claim 1 wherein the stop means includes an arm extending downwardly from one end of the tubular member and engageable with a rearwardly facing surface on the adjacent support member.

10. The invention defined in claim 9 wherein each pivot means includes a shaft connected to one member and an angular bushing connected to the other member and operative to journal the shaft, the contact area of the shaft with the bushing being relatively small to accommodate axial misalignment of the shaft relative to the bushing.

* * * * *